(12) United States Patent
Cecchi et al.

(10) Patent No.: US 6,344,756 B1
(45) Date of Patent: Feb. 5, 2002

(54) ECHO CANCELLATION CIRCUIT FOR A BI-DIRECTIONAL CURRENT MODE LINK

(75) Inventors: Delbert Raymond Cecchi, Rochester; Charles C. Hanson, Goodhue; Curtis Walter Preuss, Olmsted, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/712,594

(22) Filed: Nov. 14, 2000

(51) Int. Cl.[7] .............................................. H03K 17/16
(52) U.S. Cl. .............................. 326/26; 326/30; 326/82
(58) Field of Search ............................... 326/21, 26, 30, 326/82, 83, 86

(56) References Cited

U.S. PATENT DOCUMENTS 6,025,736 A * 2/2000 Vora et al. ..................... 326/39
6,166,561 A * 12/2000 Fifield et al. ................. 326/86
6,229,333 B1 * 5/2001 Martin et al. ................. 326/27

* cited by examiner

Primary Examiner—Michael Tokar
Assistant Examiner—Don Phu Le
(74) Attorney, Agent, or Firm—Bracewell & Patterson LLP

(57) ABSTRACT

An echo cancellation circuit for neutralizing signal reflections in a differential link interface, and a method for achieving the same. The differential link interface includes a line driver that generates a line drive signal and a replica driver for generating a replica signal that mirrors the line drive signal within the differential link. The echo cancellation circuit includes a slope adjustment device within the replica driver for temporarily altering the slope of the replica line drive signal during a signal reflection at the output of the line driver, such that the amplitude of the replica signal corresponds to the amplitude of the line drive signal during the signal reflection.

17 Claims, 3 Drawing Sheets

ECHO CANCELLATION CIRCUIT FOR A BI-DIRECTIONAL CURRENT MODE LINK

BACKGROUND OF THE INVENTION

1. Technical Field

The present invention relates in general to differential mode links, and in particular to a system and method for neutralizing signal echoes that reflect from physical discontinuities in a differential mode link interface to a cable.

2. Description of the Related Art

Serial data transfer is a form of data output that utilizes a digital communication interface for sending and receiving data in digital format. Serial data transfer has been a common method for transferring and collecting data because it provides a reliable and fully standardized link between a transmitter and receiver.

Any two devices equipped with a serial data interface can communicate with one another. A serial data interface also provides bi-directional communication so that operating parameters of a connected device can be remotely programmed by a host device. Another significant advantage of serial data transfer is that it is highly resistant to electrical noise.

Serial data interfaces are very versatile. Serial data that is sent and received between a sensor and host can be configured in a variety of ways. Differential signaling is a common serial transmission technique whereby differential voltages are utilized for transmitting data to allow the use of longer cabling and faster data transfer rates.

Differential signaling is typically implemented utilizing two wires (in addition to a ground wire) that maintain differentially opposed voltages of +V volts and −V volts. Due its superior noise suppression, differential signal transmission cables commonly have lengths of up to several hundred meters, and data rates exceeding 1 Mbps.

An further enhancement to differential signal transmission is a developing technology known as simultaneous bi-directional signaling. Simultaneous bi-directional signaling allows each differential wire pair to carry two data streams, one in each direction. The channel bandwidth is effectively doubled without raising the baud rate thus allowing the use of lower cost package options for a given data transmission rate.

Within a simultaneous bi-directional system, current source drivers are utilized to interface host devices on both ends of the cable. An exemplary differential driver suitable for such applications is discussed in related patent application ROC9-1999-0212, Ser. No. 09/506,754 the subject matter of which is incorporated herein by reference. A characteristic of such drivers is that an inverted replica of the driver output voltage is generated by a replica circuit. The purpose of this inverted replica signal is to permit a bi-directional receiver to properly receive and understand incoming traffic during periods in which the local driver is transmitting from the node.

To accomplish this masking effect, the inverted replica output is subtracted from the outgoing driver signal in the bidirectional receiver in order to extract the incoming signal that is superimposed on the driver output voltage.

A problem arises, however, due to physical discontinuities and imperfections on the interface between the line driver and the network cable utilized to carry differential network signals. Sources of such discontinuities include imperfections in packaging in addition to capacitance associated with substrate-to-card contacts.

Signals from the link driver switch at frequencies that result in portions of driver signals being reflected from the discontinuities. The result is that the discontinuities reflect the outgoing driver signals back across the driver substrate causing an echo that distorts the desired output transition. As previously explained the simultaneous bi-directional receiver receives the output driver signal and subtracts this from a replicated driver signal in order to extract an incoming network signal. Since the driver output signal is applied to the receiver from a common physical interface at which incoming bus signals are received from the network, the echo caused by interface discontinuities negatively impacts the receiver's ability to receive and translate the incoming data reliably.

From the foregoing, it can be appreciated that a need exists for a system and method for canceling noise reflections generated in a differential link interface.

SUMMARY OF THE INVENTION

An echo cancellation circuit for neutralizing signal reflections in a differential link interface, and a method for achieving the same are disclosed herein. The differential link interface includes a line driver that generates a line drive signal and a replica driver for generating a replica signal that mirrors the line drive signal within the differential link. The echo cancellation circuit includes a slope adjustment device within the replica driver for temporarily altering the slope of the replica line drive signal during a signal reflection at the output of the line driver, such that the amplitude of the replica signal corresponds to the amplitude of the line drive signal during the signal reflection.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Figure 1:
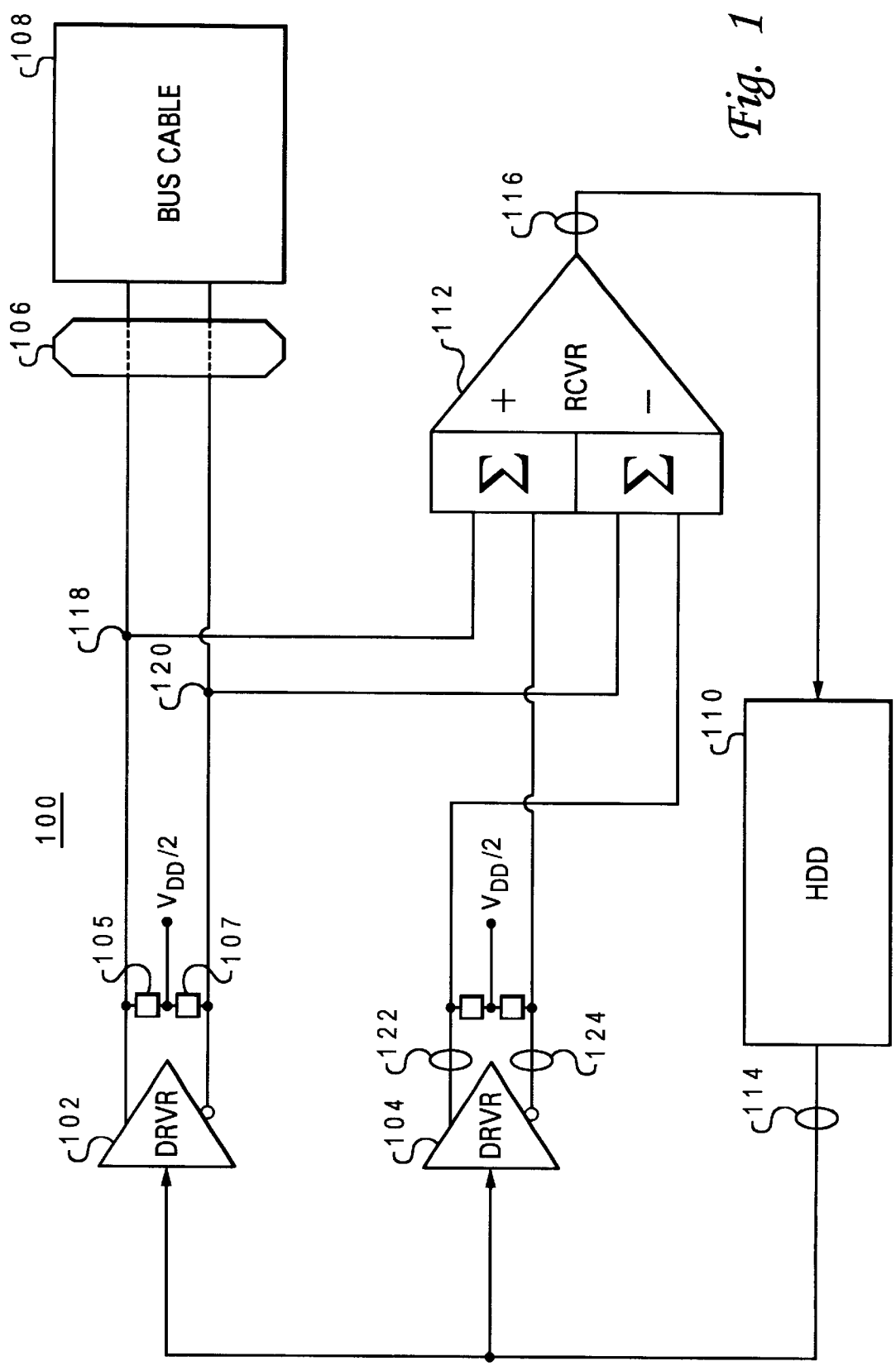
FIG. 1 illustrates a differential link interface in which the echo cancellation system of the present invention is applicable.

With reference now to the figures, wherein like reference numerals refer to like and corresponding parts throughout, and in particular with reference to FIG. 1, there is illustrated a digital communication interface in which the echo cancellation system of the present invention is applicable. Specifically, FIG. 1 depicts a simultaneous bi-directional differential link interface 100 that includes a line driver 102 that serves to drive output signals on output line 114 from a hard disk drive (HDD) system 110 to a bus cable 108. Differential link interface 100 is representative of a variety of possible bus interface devices for providing a communications link from a device to a differential serial bus.

In the depicted embodiment, bus cable 108 serves as the distribution medium for serial data transfer to and from connected devices such as HDD 110. Serial data is sent across bus cable 108 and is received by a bi-directional receiver 112 through a cable interface 106. In a preferred embodiment of the present invention, simultaneous bi-directional serial transmission, as described in related U.S. patent application ROC9-1999-0212 Ser. No. 09/506, 754 is used as the serial data communication protocol utilized to coordinate communications over bus cable 108. Data received by external nodes on bus cable 108 are received by receiver 112 which then forwards designated data to HDD 110 via receiver output 116.

In accordance with differential signaling convention, two wires 118 and 120 (in addition to a ground wire not depicted) maintain differentially opposed voltages of +V volts and −V volts at the output of driver 102. Such differential wire pair is also implemented on bus cable 108 such that if a noise spike occurs on both of the two data transmission wires, the noise spike will be ignored.

Within digital data transfer systems that may incorporate differential link interface 100, line drivers and receivers are utilized to exchange data between two or more nodes in a network. Driver 102 and receiver 112 perform such functions for HDD 110. A characteristic of driver 102 is that a replica of the differential driver output voltages on lines 118 and 120 is generated by a replica driver 104 on a pair of corresponding output lines 122 and 124.

The purpose of this replica signal is to permit bi-directional receiver 112 to mask out local transmissions from driver 102 so that receiver 112 can properly receive and understand incoming traffic received on lines 118 and 120. Receiver 112 subtracts the voltages originating from local driver 102 from the total voltage on lines 118 and 120. In the embodiment depicted, replica driver 104 produces a scaled copy of the line driver output from driver 102. The differential replica outputs 122 and 124 from replica driver 104 are added to driver outputs 120 and 118, respectively, resulting in the differential replica output being subtracted from the outgoing driver signal at the input of bi-directional receiver 112. The incoming signal from a far end driver that is superimposed on the driver output on lines 118 and 120 is thus extracted.

Bus interface 106 often includes structural discontinuities and imperfections. Such discontinuities include imperfections in packaging in addition to capacitance associated with substrate-to-card contacts.

The switching frequencies of the signals from driver 102 result in portions of these driver signals being reflected from the discontinuities at bus interface 106 back to driver output lines 118 and 120. Such reflected driver signals are referred to herein interchangeably as signal reflections or signal echos.

Figure 2:
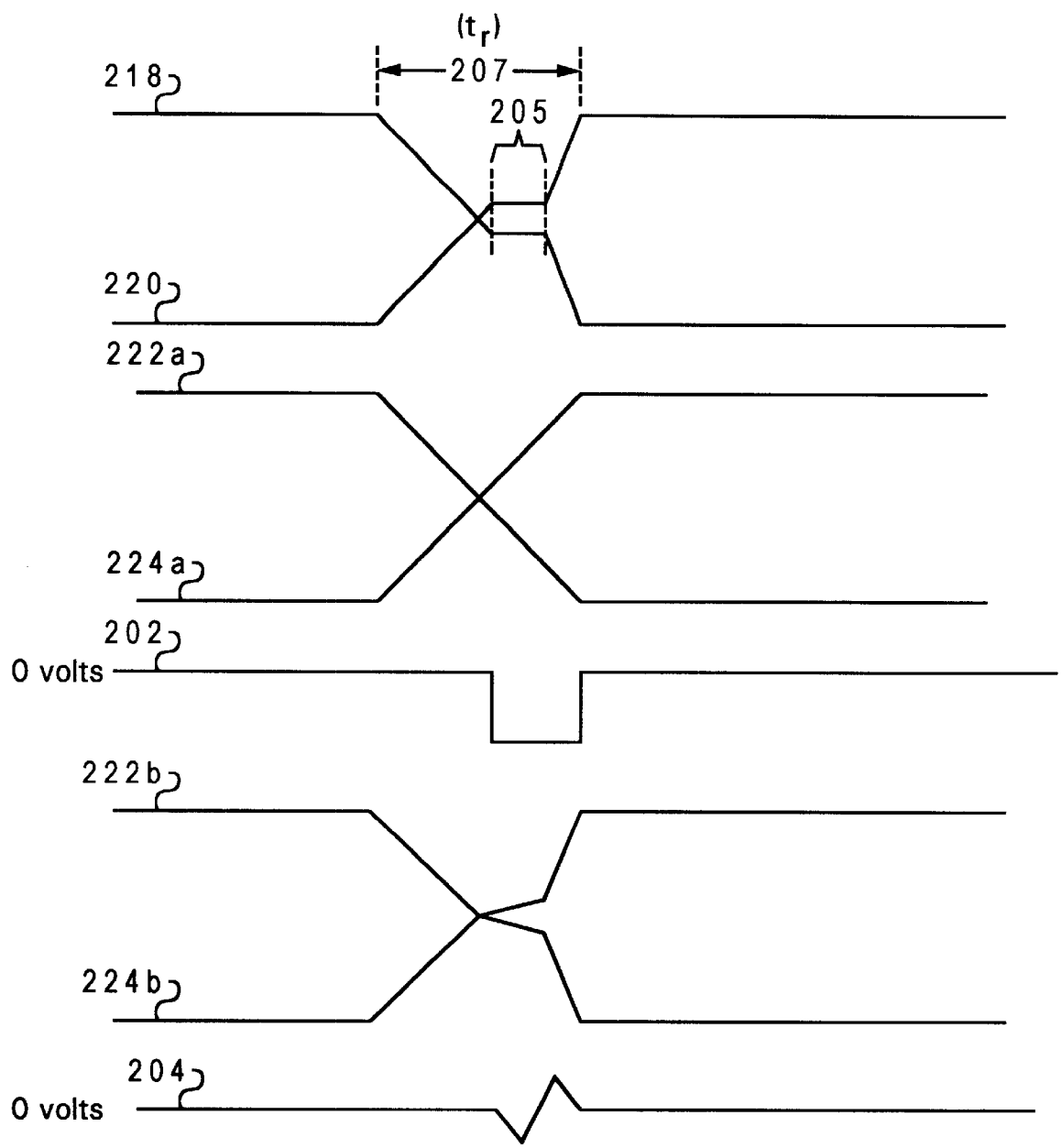
FIG. 2 is a waveform diagram depicting echo cancellation within a differential link interface in accordance with a preferred embodiment of the present invention.

Turning now to FIG. 2, a waveform diagram depicts differential outputs of driver 102 and replica driver 104. A drive output voltage signal 218 and its inverse 220 represent the voltage levels on driver output line 118 and inverter driver output line 120 during a differential signal transition (high-to-low for signal 218 and low-to-high for signal 220) in which an echo occurs at approximately the middle of the rising and falling edges.

A signal echo occurs over an echo interval 205 over which the outgoing driver signals 218 and 220 are reflected back across bus interface 106 causing an echo of opposite polarity to the desired output transition. As shown in FIG. 2, this reflection results in the rise or fall of differential outputs 218 and 220 being temporarily interrupted over echo interval 205. The timing of an echo from bus interface 106 is determined by the distance from the point of reflection within bus interface 106. For example, if this distance is 20 mm, the round trip from the launch of the signal to the return echo is approximately 400 picoseconds (psec). Further assuming that the differential signal rise time is 800 psec, the reflection will return to the terminating resistance 105 and 107 at approximately the middle of the rising and falling edges. The reflection return time can thus be predicted for a given bus interface and neutralized in accordance with the principles set forth hereinbelow.

As further illustrated in FIG. 2, the reflection occurring over interval 205 results in differential replica output voltages represented by signals 222a and 224a not properly mirroring differential driver outputs 218 and 220. Bi-directional receiver 112 receives differential driver signals 218 and 220 and subtracts from these the replicated driver signals from replica driver 104 in order to extract an incoming network signal. Since differential driver signals 218 and 220 are applied to inputs 118 and 120 of receiver 112 from a common physical interface at which incoming bus signals are received from the network, the echo caused by interface discontinuities negatively impacts the receiver's ability to receive and translate the incoming data reliably. The result of the mismatch between differential driver outputs 218 and 220 and replicated driver outputs 222a and 224a is illustrated by a differential error signal 202 that should be zero when no input signal is being received from bus cable 108.

Figure 3:
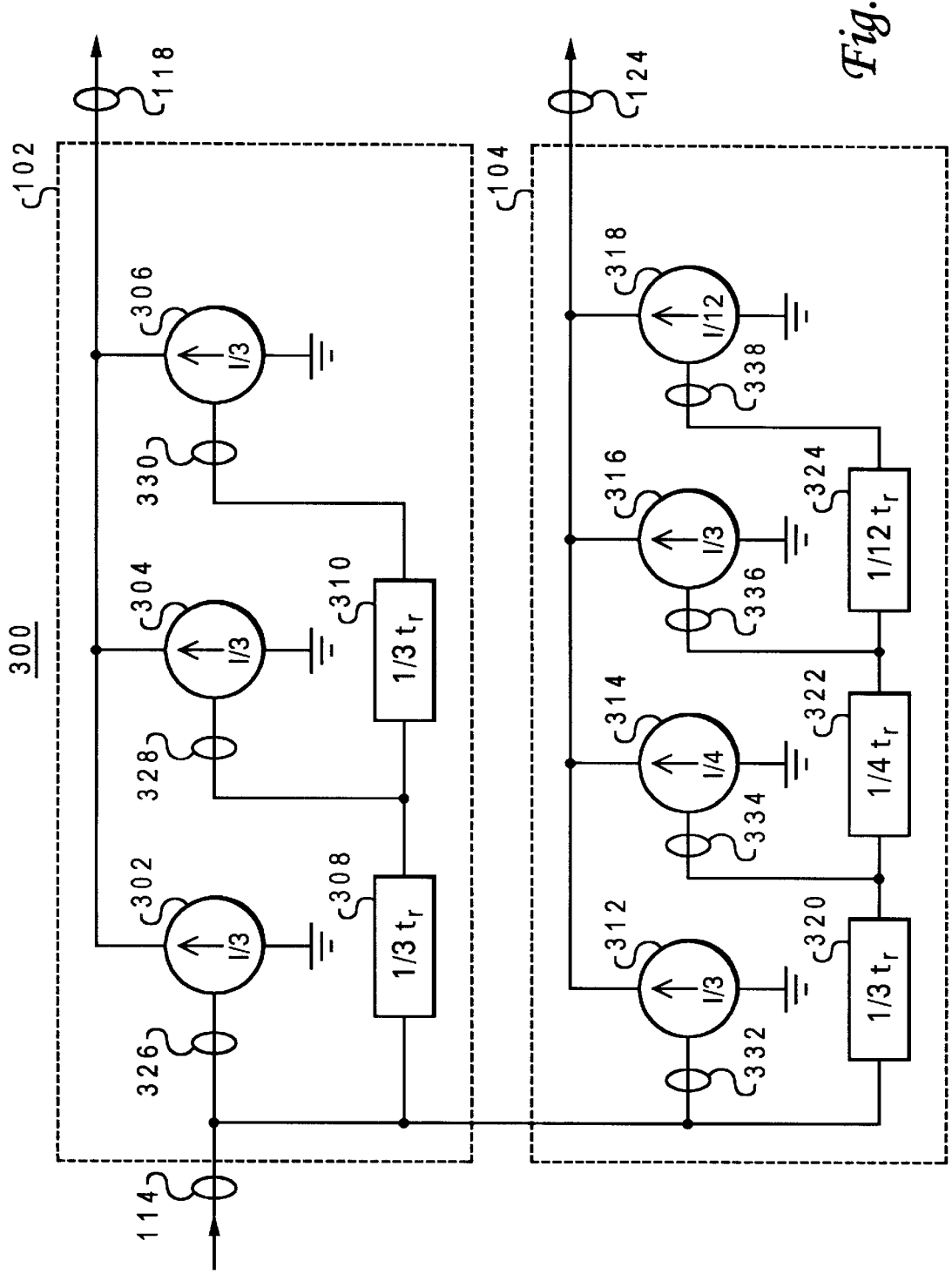
FIG. 3 depicts an echo cancellation circuit in accordance with a preferred embodiment of the present invention.

With reference now to FIG. 3, there is depicted an echo cancellation circuit implemented within driver 102 and replica driver 104 in accordance with a preferred embodiment of the present invention. In particular, an echo cancellation circuit 300 is depicted that includes line driver 102 and replica driver 104. Only the non-inverted current driver for driver 102 and its associated output 118, together with the inverted driver for replica driver 104 and its associated output 124, are shown in FIG. 3 for illustrative simplicity. The inverted differential outputs of replica driver 104, are represented in FIG. 2 as a pair of differential signals 222b and 224b, wherein replica output signal 224b is the inverted output generated at replica output 124 of FIG. 3.

As depicted in FIG. 3, line driver 102 includes three parallel current sources 302, 304, and 306 that each contribute ⅓ of the total output drive signal at drive output 118. Current sources 302, 304, and 306 include control inputs 326, 328, and 330, respectively, that receive a line drive control signal at driver input 114. In a preferred embodiment, the line drive control signal is a binary logic signal that acts as a switch for initiating a differential output transition such as the transition depicted in FIG. 2 corresponding to a digital communication signal from HDD 110.

In a preferred embodiment of the present invention, the individual contributions of current sources 302, 304, and 306 are sequentially delayed in order to increase the rise time of drive output 218 and decrease susceptibility to signal reflections. In the embodiment depicted in FIG. 3, this delay is achieved within line driver 102 utilizing delay elements 308 and 310 that are connected between driver input 114 and the control inputs of current sources 304 and 306, respectively.

When a line drive control signal is received at drive input 114, current source 302 is immediately activated and produces a current equal to ⅓ of the total drive current at drive output 118. After a delay period of (⅓)$t_r$ induced by delay element 308, the line drive control signal is applied to control input 328 whereupon current source 304 produces an additional ⅓ of the eventual total drive current at drive output 118, wherein $t_r$ represents the rise time 207 illustrated in FIG. 2. Control input 330 is similarly cascaded with respect to the line drive control signal, resulting in current source 306 being activated after a delay period of (⅔)$t_r$.

Inverted replica output 124 is utilized by bi-directional receiver 112 to cancel an outgoing signal from non-inverted driver output 118. As explained with reference to FIGS. 1 and 2, the replica outputs must match the driver outputs to ensure the integrity of the signal cancellation. As explained in further detail below, replica driver 104 includes a slope adjustment mechanism for achieving this result.

Four parallel current sources 312, 314, 316, and 318 are included within the slope adjustment mechanism of replica driver 104. As depicted in FIG. 3, current sources 312, 314, 316, and 318 have control inputs 332, 334, 336, and 338 that are temporally cascaded with respect to a line drive control signal on drive input 114 similar to the control input arrangement of the current sources within line driver 102.

The slope adjustment mechanism within replica driver 104 is embodied by the relative output magnitudes of the parallel replica current sources in concert with the relative delays induced on a line drive control signal at drive input 114 to the temporally cascaded control inputs. In accordance with the assumption that the signal reflection will occur somewhere in the middle of the rise/fall of the drive signal at drive output 118, the slope adjustment mechanism is designed to temporarily adjust (reduce in this case) the slope of the rise/fall transition during the equivalent of echo interval 205 over which the signal reflection is anticipated.

The activation delay and the output magnitudes of current sources 314, 316, and 318 are determined as a function of any one or all of the following: the activation delay and output magnitudes of current sources 302, 304, and 306; the delay induced by line drive delay elements 308 and 310; and the anticipated reflection arrival time. The net effect of this correlation is that the rising/falling slope of the transition for replica signal 222b and 224b (FIG. 2) is reduced such that the differential replica output more closely corresponds to the differential line drive output during echo interval 205.

As previously explained, the arrival time of a signal reflection may be determined in accordance with known structural characteristics of the differential link interface in question, or may be determined empirically for a given interface. In either case, the slope adjustment mechanism, embodied by the relative current distribution arrangement for line driver 102 and replica driver 104, is determined in the exemplary embodiment shown in FIG. 3 as follows.

For the embodiment depicted in FIG. 3, a signal reflection is anticipated to occur sometime after the one-third point of the rise/fall transition. Therefore no echo cancellation is required for at least the first third of the replica rise/fall time. To this end, current source 312 produces a current level equal to that of current source 302 (i.e., current source 312 generates ⅓ of the eventual total replica current at inverted output 124) immediately upon a line drive control signal being applied to drive input 114.

As depicted in FIG. 3, current sources 314, 316, and 318 have output current magnitudes I/4, I/3, and I/12, respectively, wherein I represents the total replica drive current required to transition inverted output 224b from low to high. A delay of (⅓)$t_r$ is induced by delay element 320 with respect to the line drive control signal such that current source 314 is activated simultaneously with drive source 304. However, since the output magnitude of current source 314 (I/4) is less than that of drive source 304 (I/3), the slope of the signal at inverted replica output 124 (signal 224b in FIG. 2) is less steep (aside from being opposite in polarity) to the slope of non-inverted drive output 218 at the beginning of echo interval 205 at approximately the middle of the output transition (high-to-low for signal 218 and low-to-high for signal 224b).

In addition to contrasting output magnitudes between an $n^{th}$ stage current source across driver 102 and replica driver 104 ($2^{nd}$ drive source 304 and $2^{nd}$ nd replica source 314, for example), the slope adjustment mechanism depicted in FIG. 3 further includes disparity in the delays induced for a given stage. For example, the individual delays imposed on the input drive control signal by delay elements 322 and 324 before reaching the third and fourth stages of replica driver 104 provide a steeper slope transition for inverted replica output 224b than for drive output 218 over the last ⅓ of the differential output transition.

The result of the echo cancellation achieved by the slope adjustment mechanism embodied within replica driver 104 as described above is depicted by differential error signal 204 in FIG. 2. As depicted therein, the slope adjustment achieved by the slope adjustment device during echo interval 205 results in a greatly diminished error signal received by receiver 112.

While the invention has been particularly shown and described with reference to a preferred embodiment, it will be understood by those skilled in the art that various changes in form and detail may be made therein without departing from the spirit and scope of the invention.

What is claimed is:

1. A circuit for neutralizing signal reflections in a differential link interface, wherein said differential link interface includes a line driver that generates a line drive signal, said circuit comprising:
   a replica driver for generating a replica signal that mirrors said line drive signal within said differential link; and
   a slope adjustment device for temporarily altering the slope of said replica line drive signal during a signal reflection at the output of said line driver, such that the amplitude of said replica signal corresponds to the amplitude of said line drive signal during said signal reflection.

2. The circuit of claim 1, wherein said line driver includes n drive current sources that each generate 1/n of the total drive current, and wherein said slope adjustment device comprises m current sources, wherein at least one of said m current sources generates 1/z of the total replica current, wherein m>n and z>n.

3. The circuit of claim 1, wherein said line driver includes n drive current sources that each generate 1/n of the total drive current, and wherein said slope adjustment device comprises m current sources, wherein at least one of said m current sources generates 1/z of the total replica current, wherein m<n and z<n.

4. The circuit of claim 1, wherein said line driver is a current driver having a plurality of parallel drive current sources that generate said line drive current in response to receiving a line drive control signal.

5. The circuit of claim 4, wherein said replica driver is a current driver having a plurality of current sources that generate said replica signal in response to said line drive control signal.

6. The circuit of claim 4, wherein said line drive control signal is a logic input signal for initiating communication from a data processing device within said differential link interface.

7. The circuit of claim 5, further comprising:
an $n^{th}$ drive current source having an output drive current amplitude of x; and
an $n^{th}$ replica current source having an output replica current amplitude of y, wherein y x.

8. The circuit of claim 5, wherein each of said plurality of drive current sources includes a drive control input for receiving said line drive control signal, and wherein said slope adjustment circuit further comprises at least one delay element between each of said control inputs such that said control inputs are temporally cascaded with respect to said line drive control signal and said plurality of drive current sources are sequentially activated in accordance with the delay of said line drive control signal across said delay elements.

9. The circuit of claim 8, wherein each of said plurality of current sources within said replica driver includes a drive control input for receiving said line drive control signal, and wherein said slope adjustment device further comprises at least one delay element between each of said control inputs such that said control inputs for said replica driver are temporally cascaded with respect to said line drive control signal and said plurality of current sources within said replica current driver are sequentially activated in accordance with the delay of said line drive control signal across said delay elements.

10. The circuit of claim 9, wherein the delay induced by said delay elements of said slope adjustment device is a function of both the delay induced by said line drive delay elements and an anticipated arrival time of a signal reflection such that the slope of said replica signal corresponds to the slope of said drive current during said signal reflection.

11. A method for neutralizing signal reflections in a differential link interface, wherein said differential link interface includes a line driver that generates a line drive signal, said method comprising:
generating a replica signal that mirrors said line drive signal within said differential link; and
temporarily altering the slope of said replica line drive signal during a signal reflection at the output of said line driver, such that the amplitude of said replica signal corresponds to the amplitude of said line drive signal during said signal reflection.

12. The method of claim 11, wherein said differential link includes a receiver that receives data at a common medium shared by said line drive signal, said method further comprising subtracting said replica signal from said line drive signal at the input of said receiver such that said receiver extracts an incoming signal superimposed on said line drive signal.

13. The method of claim 11, further comprising generating said line drive current in response to receiving a line drive control signal.

14. The method of claim 13, wherein said line driver comprises a plurality of current sources, and wherein said replica signal is generated within a replica driver comprising a plurality of current sources, said method further comprising setting the amplitude of each of said current sources within said replica driver relative to the output amplitudes of said current sources within said line driver such that the output signal of said replica driver approximates said line drive signal during a signal reflection.

15. The method of claim 14, wherein each of said plurality of current sources within said line driver includes a drive control input for receiving said line drive control signal, said method further comprising delaying said line drive control signal between each of said control inputs such that said control inputs are temporally cascaded with respect to said line drive control signal and said plurality of drive current sources are sequentially activated in accordance with the delay of said line drive control signal across said delay elements.

16. The method of claim 15, wherein each of said plurality of current sources within said replica driver includes a drive control input for receiving said line drive control signal, said method further comprising delaying said line drive control signal between each of said control inputs such that said control inputs for said replica driver are temporally cascaded with respect to said line drive control signal and said plurality of current sources within said replica driver are sequentially activated in accordance with the delay of said line drive control signal across said delay elements.

17. The method of claim 16, wherein the delay induced by said delay elements of said slope adjustment device is a function of both the delay induced by said line drive delay elements and an anticipated arrival time of a signal reflection such that the slope of said replica signal corresponds to the slope of said drive current during said signal reflection.

* * * * *